(12) United States Patent
Yosef

(10) Patent No.: US 6,626,446 B1
(45) Date of Patent: Sep. 30, 2003

(54) PRAM, SHOPPING TROLLEY OR THE LIKE

(76) Inventor: Hassan Yosef, Kalmgatan 10, Johanneshov (SE), S-121 45

( * ) Notice: Subject to any disclaimer, the term of this patent is extended or adjusted under 35 U.S.C. 154(b) by 0 days.

(21) Appl. No.: 09/856,598

(22) PCT Filed: Nov. 24, 1999

(86) PCT No.: PCT/SE99/02184
§ 371 (c)(1),
(2), (4) Date: Jul. 17, 2001

(87) PCT Pub. No.: WO00/34103
PCT Pub. Date: Jun. 15, 2000

(30) Foreign Application Priority Data

Nov. 24, 1998 (SE) .............................................. 9804066

(51) Int. Cl.[7] ................................................ B62B 9/00
(52) U.S. Cl. ............................... 280/47.38; 280/47.34; 280/47.17; 280/400; 297/256.12
(58) Field of Search ....................... 280/87.021, 87.043, 280/33.992, 33.993, 47.25, 47.34, 47.38, 47.4, 47.41, 642, 647, 648, 649, 650, 651, 658, 282, 400, 218; 297/16.1, 16.2, 256.12, 344.26, 311

(56) References Cited

U.S. PATENT DOCUMENTS

| | | | | |
|---|---|---|---|---|
| 3,335,810 A | * | 8/1967 | McColl | 280/218 |
| 3,663,038 A | * | 5/1972 | Hendricks | 280/218 |
| 3,807,760 A | * | 4/1974 | Jordan | 280/218 |
| 4,200,304 A | * | 4/1980 | Hwang | 280/218 |
| 4,691,930 A | * | 9/1987 | Samuel | 280/7.1 |
| 5,292,144 A | * | 3/1994 | Sosnoff | 280/304.1 |
| 5,328,193 A | * | 7/1994 | Shiew | 280/87.041 |
| 5,383,676 A | * | 1/1995 | Valentino | 280/271 |
| 5,884,922 A | * | 3/1999 | Pickering | 280/7.17 |
| 6,203,053 B1 | * | 3/2001 | Sohrt et al. | 280/641 |

FOREIGN PATENT DOCUMENTS

| | | | |
|---|---|---|---|
| CH | 167348 | 5/1934 | |
| DE | 2034099 | 1/1972 | |
| DE | 2342839 | 3/1975 | |
| EP | EP 0522783 A2 * | 1/1993 | ............. B62B/7/14 |

* cited by examiner

Primary Examiner—Brian L. Johnson
Assistant Examiner—Kelly E Campbell
(74) Attorney, Agent, or Firm—Ostrolenk, Faber, Gerb & Soffen, LLP

(57) ABSTRACT

An arrangement used with perambulators or shopping-carts, comprising a chassis (2) having wheels and supporting a bed, a seat or a basket crib (11). The chassis (2) is constituted by two main sections, a front section (12) and a rear section (13), the latter (13) being arranged to carry out a swinging movement relatively to the front section (12) around a substantially vertical axis (14) for the purpose of improving the maneuverability of the pram (1) in narrow spaces.

8 Claims, 5 Drawing Sheets

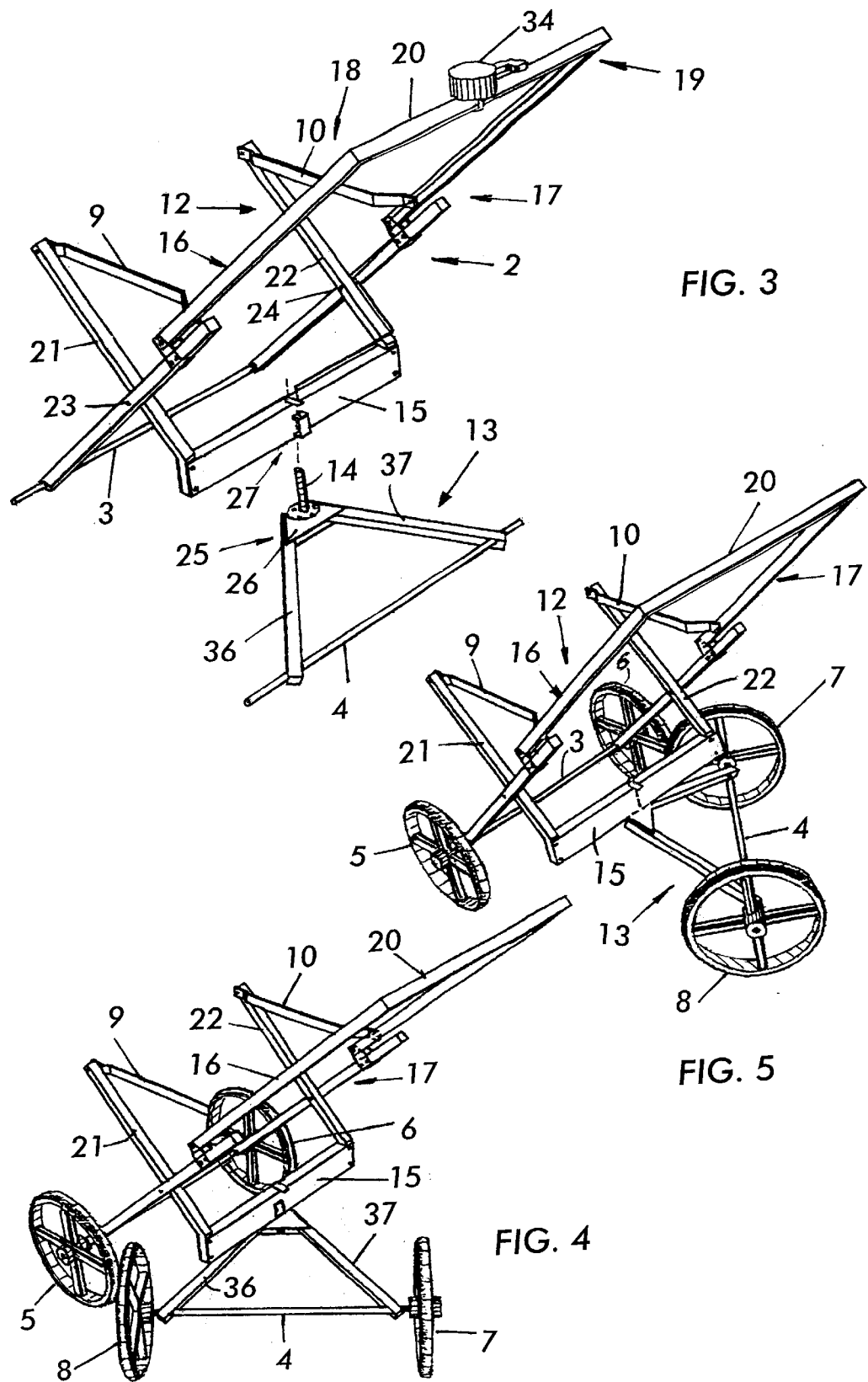

PRAM, SHOPPING TROLLEY OR THE LIKE

BACKGROUND OF THE INVENTION

The present invention relates to an arrangement in a pram, a shopping-cart or the like, comprising a chassis which is provided with wheels, supports a bed, a seat or a basket and is designed so as to permit that it can conveniently be manoeuvred also in narrow spaces thanks to it being provided with a waist-pivot steering.

The prams today available on the market are designed with a chassis having wheels which either are mounted for rotation on shafts which are rigidly connected with the chassis or, in certain cases, are individually swingable relatively the shafts, that design being especially used at the front wheel pair. However, such prams are both heavy and unwieldy and it is generally troublesome to steer such a pram in narrow spaces. The reason for this is that one has, using the handle-bar, to push downwards at the rear of the pram in order to lift up the front wheels from the flor surface so that a steering function can be performed, in the way that either the left or right end of the handle-bar is pushed forwards with the front wheels maintained in their lifted position and by, at the same time, pushing the pram forwards. This involves that the back of the person handling the pram is exposed to considerable strain, especially during the phase during which the handle-bar is pressed down to lift the front wheels. This type of situation is especially inappropriate for women who have recently given birth. The same problem arises with some types of shopping-carts or the like.

SUMMARY OF THE INVENTION

The object of the present invention is consequently to provide a cart of the general type mentioned above at which the shortcomings of the presently known cart designs have been eliminated by use of a waist-pivot steering. The features characterizing the invention are set out in the claims.

Thanks to the present invention there has now been provided a design which in an excellent manner satisfies the use requirements and at the same time can be manufactured in a simple, low-cost way. The waist-pivot steered cart has a chassis which is constituted by two sections, a front section and a rear section, which can be turned relatively each other around a substantially vertical axis. When the cart is driven forwards, the rear section will follow like a tail. This makes it very convenient to proceed and to manoeuvre the cart, especially in narrow spaces. In addition thereto this design is more ergonomic than the prior art designs thanks to the fact the back of the driving person will not be exposed to any strain when carrying out the moment required to change the direction of movement.

BRIEF DESCRIPTION OF THE DRAWINGS

A preferred embodiment will be described below, reference being made to the annexed drawing.

FIG. 3 shows the chassis of the cart, the wheels being removed and the front section being disconnected from the rear section.

FIG. 4 is a perspective view of the chassis shown in FIG. 3 in an assembled condition and with the wheels mounted, the rear section assuming a maximum angular position in relation to the front section.

FIG. 5 corresponds to FIG. 4 but shows the rear section in its opposite limit angular position.

DETAILED DESCRIPTION

Figure 1:
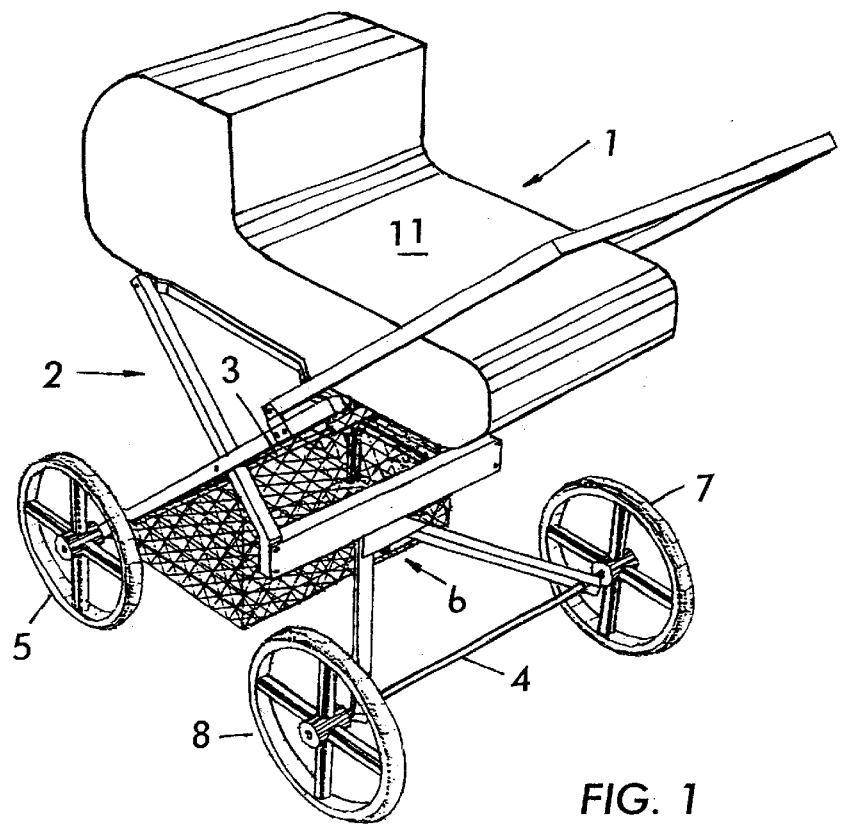
FIG. 1 illustrates all of a pram designed according to the present invention showing all components used in that connection.
Figure 2:
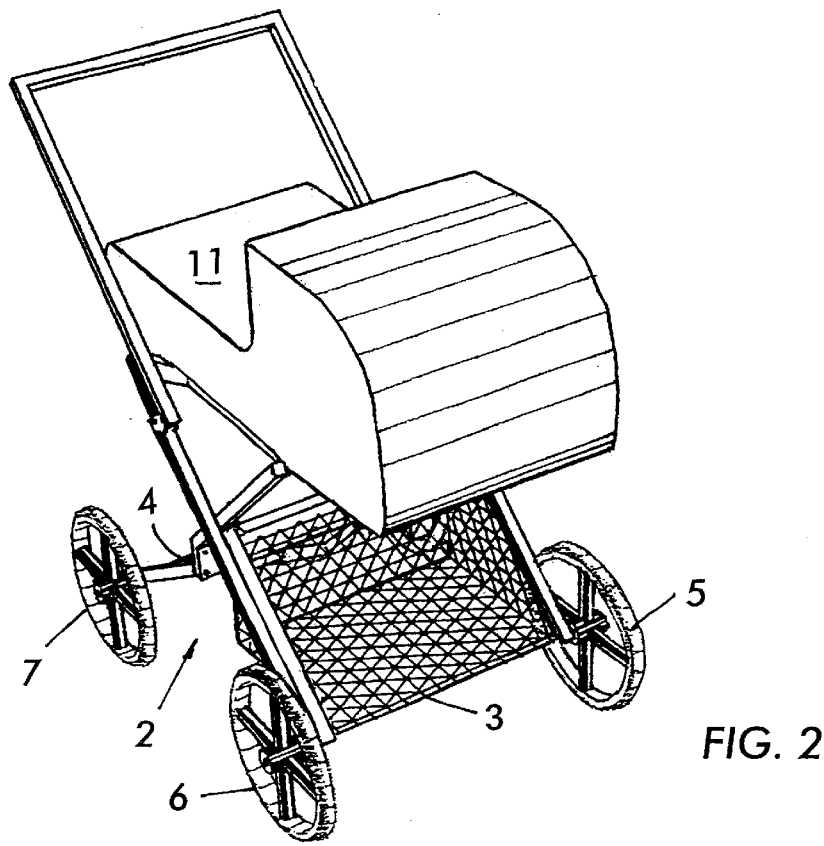
FIG. 2 is a perspective view showing the pram illustrated in FIG. 1 with its front facing the observer.

As appears from the drawings, there has been shown the present invention as applied to a pram 1, comprising a chassis 2 with wheels 5, 6, 7 and 8 mounted on shafts 3 and 4. The chassis 2 is constituted by two main sections, namely a front section 12 and a rear section 13, the latter being rotatably connected with the front section by means of a substantially vertical pivot 14. The chassis 2 does also comprise mounting means in the shape of two parallel support rods 9, 10 for a basket crib or a seat 11.

The rear section 13 is swingably connected with a central porportion of a cross bar 15 in the front section 12 interconnecting rods 16, 17 which extend upwards from the front wheels 5, 6 and which have their top ends 18, 19 interconnected by a handle-bar 20.

The front section 12, in addition to the rods 16, 17 extending from the shaft 3 of the front wheels 5, 6 to the handle bar 20, have a so-called basket crib mounting which is constituted by two substantially horizontal support rods 9, 10 which in turn are swingably connected with downwards directed rods 21, 22, which via joints 23, 24 at rods 16, 17 are connected with the cross bar 15.

The rear section 13 is constituted by two rods 36, 37 attached to and converging from the rear shaft 4 for the wheels 7, 8. They are interconnected at a predetermined angle and do at their front connection point 2a exhibit at least one mounting plate 26 supporting pivot 11, which cooperats with and passes through a hole 27 in the cross bar 15. Pivot 14 has a position-fixing and limiting disk 29 provided with one or more holes 30 for the purpose of locking the rear section 13 in a desired angular position. This function is carried out by means of a pin holder 31, secured to cross bar 15, and a pin 32 which is displaceable in the holder and cooperates with holes 30. The disk 29 does also have blocks 33 limiting the swinging movement of the rear section in both directions.

According to an alternative embodiment the cross bar 15 in the front section 12 is constituted by two converging rods 39 and 40 connected to rods 21 and 22 and attached to a member 41 provided with hole 27 which cooperates with pivot 14.

Figures 8, 8A:
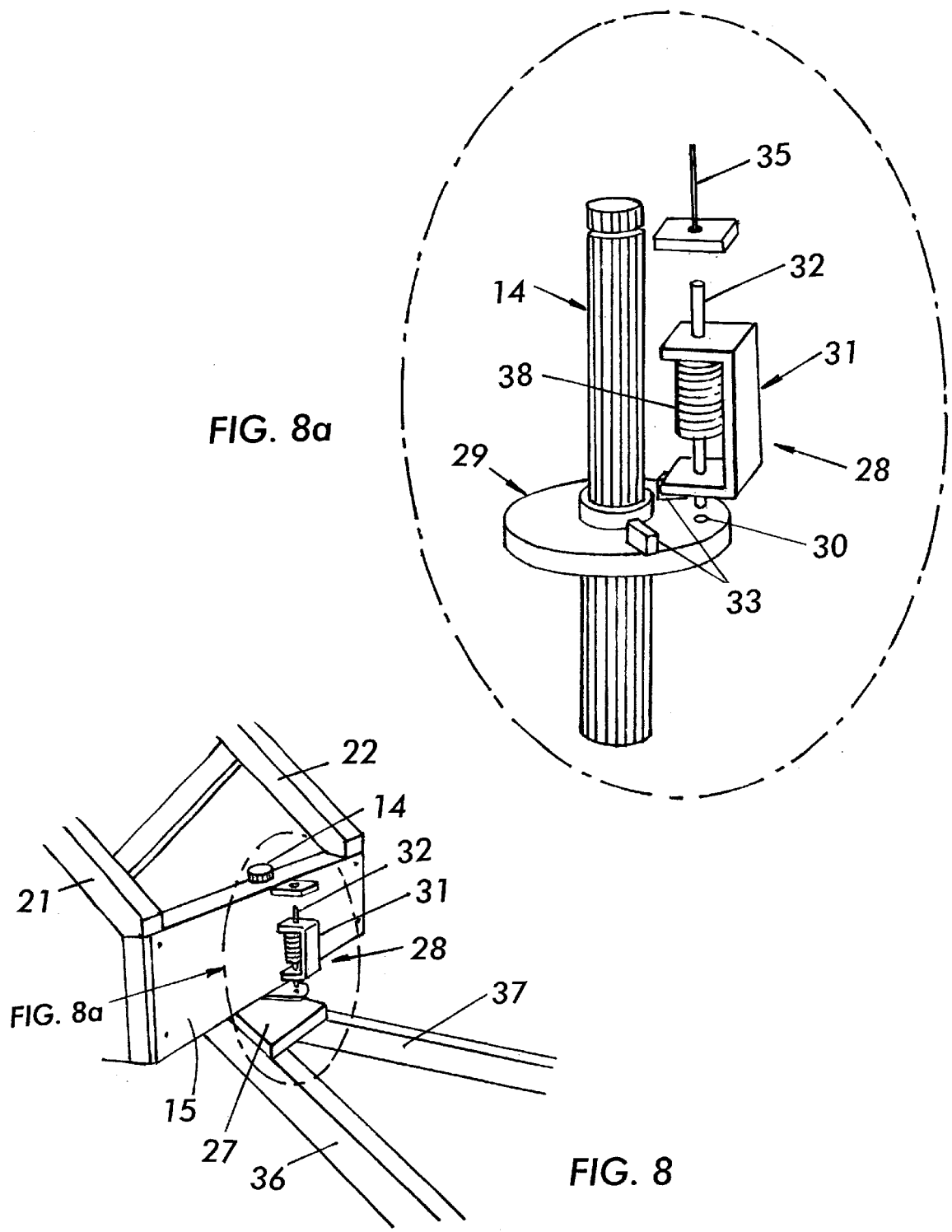
FIG. 8 is a partial perspective view showing the coupling between the rear and the front sections and also, in a larger scale, the pivot together with its locking and limiting means.
FIG. 8a is an enlargement of the partial perspective view of FIG. 8.
Figure 9:
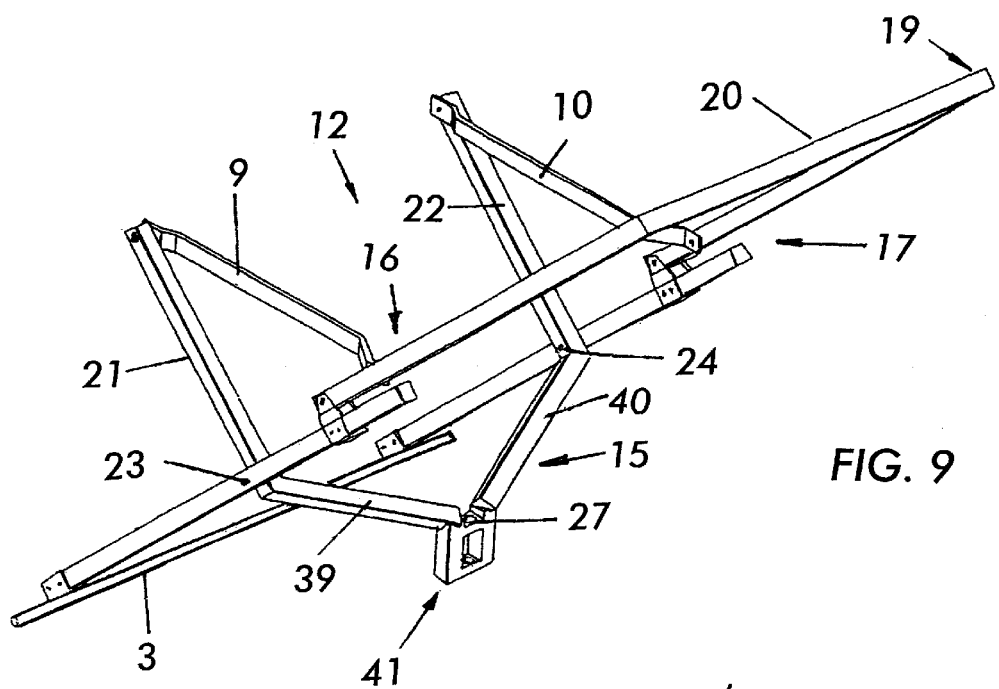
FIG. 9 is a perspective view relating to another embodiment and showing the front sections of the chassis, the wheels of which are removed.
Figure 10:
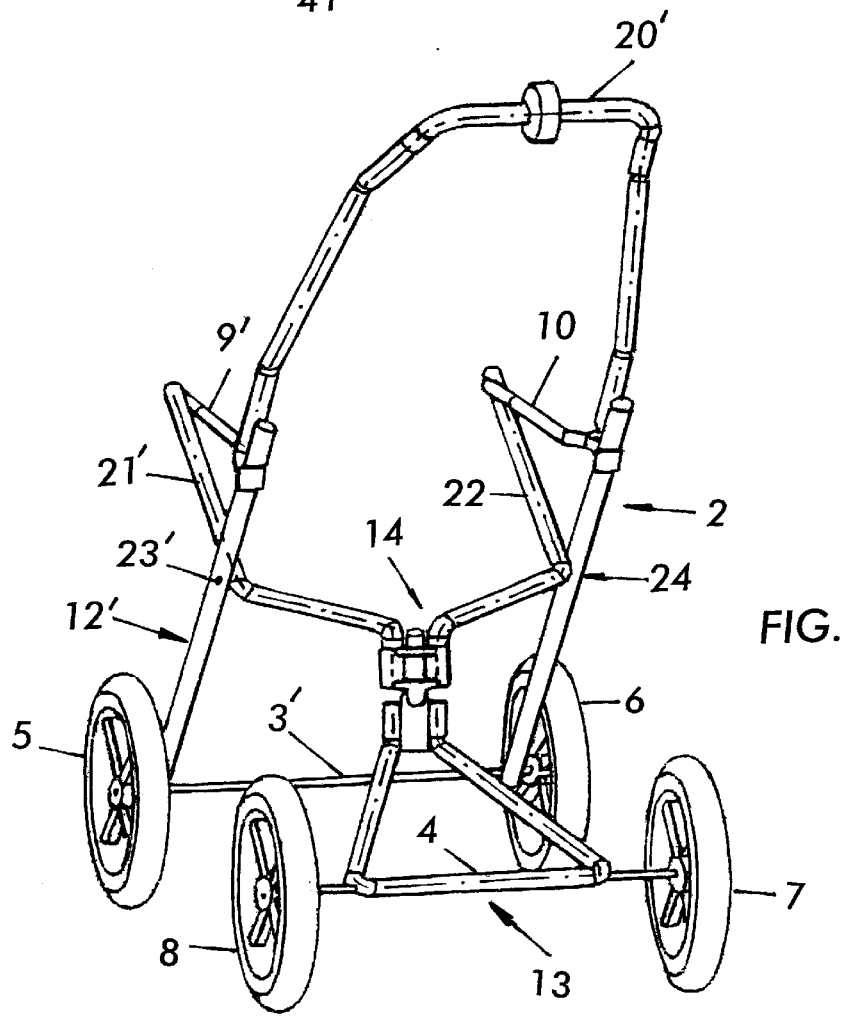
FIG. 10 illustrates another embodiment of the present invention.

In FIG. 8 there is illustrated how the swinging position of the rear section 13 can be fixed with the aid of the position-fixing and limiting device 26. It is used to lock the chassis sections 12 and 13 in fixed relative positions in situations such as when the pram shall be passed down steps or into a vehicle. On the handle-bar 20 there is a control lever 34 which over a wire 35 actuates pin 32, the function of which is to lock the rear section 13 relatively the front section 12. Pin 32 is biassed downwards by a spring 38 which, in response to the position of the control lever 34, can lock the rear section 13 in desired angular positions. Disk 29 does also include the abovementioned blocks 33 limiting the maximum angular position of the rear section 13.

Figure 6:
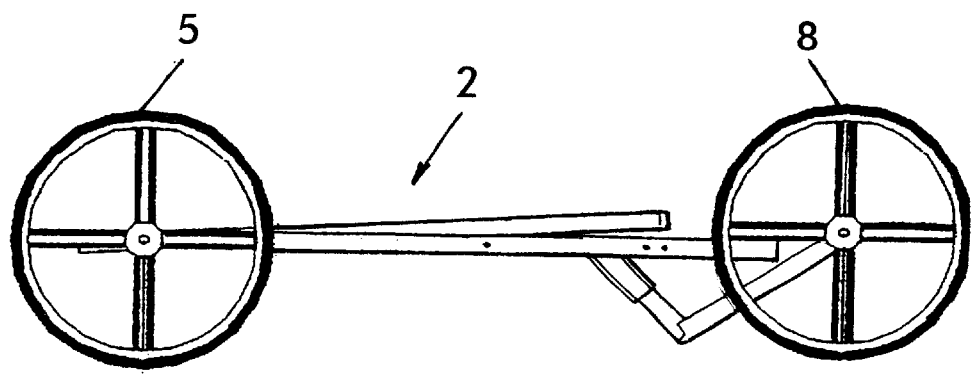
FIG. 6 shows the chassis illustrated in FIGS. 4 and 5 in a collapsed condition.
Figure 7:
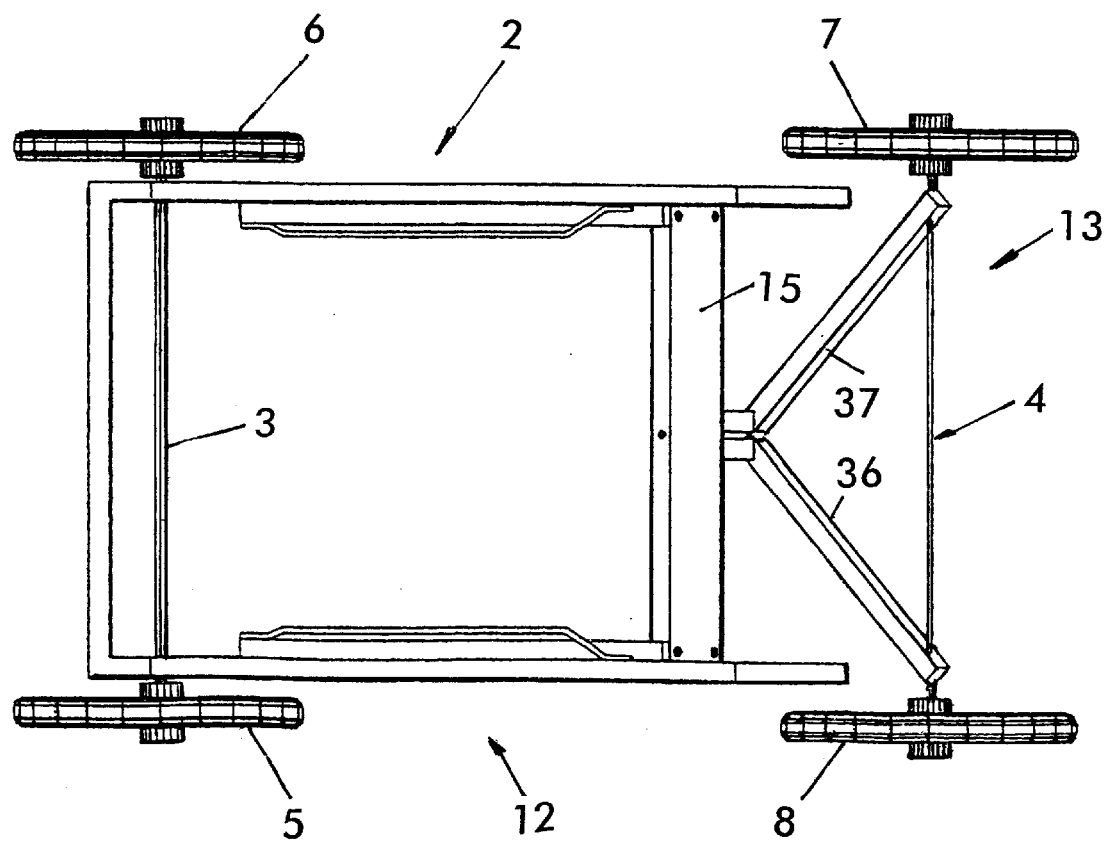
FIG. 7 is a top view of the chassis in FIG. 6.

As appears from FIGS. 6 and 7, chassis 2 can be collapsed to a position requiring a very small space. This is attained thanks to the joints between the rods, to minimize the space requirement in the collapsed position of chassis 2 also rods 16, 17 can have joints approximately at their central, straight portions.

What is claimed is:

1. An arrangement for a pram, a shopping-cart, or a buggy-type cart comprising a chassis that supports a bed, a seat, or a basket crib and comprises a plurality of wheels, a front section, and a rear section, wherein the rear section is swingably connected to the front sections via an essentially vertical pivot that is disposed between a front sections wheel pair and a rear sections wheel pair in order to increase the maneuverability of the cart in narrow spaces, wherein the rear section is swingably connected at a central portion of a cross bar that laterally stabilizes the front section and via a pair of support rods for the basket crib is supported by a second pair of support rods extending from a shaft of the front wheel pair and at a top end of each rod of the second pair of support rods interconnected by a handle-bar.

2. The arrangement according to claim 1, wherein each free end of the pair of support rods for the basket crib is in a pair of joint points swingably connected to the second pair of support rods via a pair of obliquely downwards directed rods.

3. The arrangement according to claim 1, wherein the rear section comprises a pair of converging rods which are interconnected at a predetermined angle and comprise at least one mounting plate that supports the essentially vertical pivot and is rotatably mounted in a hole in the cross bar.

4. The arrangement according to claim 3, wherein a position-fixing and limiting disk is provided on the essentially vertical pivot and comprises one or more locking holes for the purpose of locking the rear section to a desired angular position with the aid of a pin holder mounted on the cross bar and a pin that is displaceable along the cross bar and cooperates with the locking holes.

5. The arrangement according to claim 4, wherein the position-fixing and limiting disk comprises at least one pair of blocks that limit a maximum angular position of the rear section and of the front section in relatively both directions.

6. An arrangement for a pram, a shopping-cart, or a buggy-type cart comprising a chassis that supports a bed, a seat, or a basket crib and comprises a plurality of wheels, a front section, and a rear section, wherein the rear section is swingably connected to the front sections via an essentially vertical pivot that is disposed between a front section wheel pair and a rear section wheel pair in order to increase the maneuverability of the cart in narrow spaces, wherein the rear section comprises a pair of converging rods which are interconnected at a predetermined angle and comprise at least one mounting plate that supports the essentially vertical pivot and is rotatably mounted in a hole in a cross bar.

7. The arrangement according to claim 6, wherein a position-fixing and limiting disk is provided on the essentially vertical pivot and comprises one or more locking holes for the purpose of locking the rear section to a desired angular position with the aid of a pin holder mounted on the cross bar and a pin that is displaceable along the cross bar and cooperates with the locking holes.

8. The arrangement according to claim 7, wherein the position-fixing and limiting disk comprises at least one pair of blocks that limit a maximum angular position of the rear section and of the front section in relatively both directions.

* * * * *